United States Patent
McCormick et al.

(10) Patent No.: US 7,502,447 B2
(45) Date of Patent: Mar. 10, 2009

(54) CALL FAILURE RECORDING

(75) Inventors: James Stewart McCormick, Stittsville (CA); David Ker, Brossard (CA); Kulpreet Singh Badial, Kanata (CA)

(73) Assignee: Alcatel Lucent, Paris (FR)

( * ) Notice: Subject to any disclaimer, the term of this patent is extended or adjusted under 35 U.S.C. 154(b) by 745 days.

(21) Appl. No.: 10/720,225

(22) Filed: Nov. 25, 2003

(65) Prior Publication Data

US 2005/0123121 A1    Jun. 9, 2005

(51) Int. Cl.
*H04M 1/24* (2006.01)

(52) U.S. Cl. .................. 379/32.01; 379/1.01; 379/9.02; 379/9.03; 379/9.04; 379/32.02; 379/32.03; 379/32.04; 379/32.05; 714/31; 714/47; 714/48; 714/49; 714/57; 714/55

(58) Field of Classification Search ................. 379/1.01, 379/9.02–9.04, 32.01–32.05; 714/48, 57, 714/55, 49, 47, 31

See application file for complete search history.

(56) References Cited

U.S. PATENT DOCUMENTS

| | | | |
|---|---|---|---|
| 5,680,611 A | 10/1997 | Rail et al. | |
| 6,170,067 B1 * | 1/2001 | Liu et al. | 714/48 |
| 6,208,627 B1 * | 3/2001 | Menon et al. | 370/328 |
| 6,327,352 B1 | 12/2001 | Betts et al. | |
| 6,381,601 B1 | 4/2002 | Fujiwara et al. | |
| 6,594,345 B1 * | 7/2003 | Vinson | 379/48 |
| 6,788,933 B2 * | 9/2004 | Boehmke et al. | 455/423 |
| 6,792,269 B2 * | 9/2004 | Boehmke | 455/424 |

* cited by examiner

*Primary Examiner*—Quynh H Nguyen

(57) ABSTRACT

A method and device for recording call failure information in a data transmission system is provided. The failure logs generated in response to a failure event include a failure type and a first timestamp. A log record is created for a first failure log based on the failure type, and storied in a log record storage. Whenever a further failure log is generated in response to the same failure event, the further failure log includes said failure type and a current timestamp, so that it will receive the same identifier. The log record is updated to document the current timestamp.

18 Claims, 3 Drawing Sheets

CALL FAILURE RECORDING

FIELD OF THE INVENTION

This invention relates in general to the field of telecommunication switching equipment and in particular to an improved call failure recording.

BACKGROUND OF THE INVENTION

Data transmission is always subject to error or failures due to the transmission medium errors, signal integrity problems and/or failure of the equipment along the transmission path. Since the ability to reliably transmit data is of utmost importance the transmission systems are equipped with fault managers, which detect, locate and correct the faults so that the service disruptions are minimized.

Current fault managers generate a fault report whenever a fault is detected anywhere in the data transmission system, identifying the location, type and sometimes providing other information with respect to the nature of the fault. These reports are called fault logs. The fault manager then processes the logs; the basic processing includes sorting, storage, retrieval and other processing functions necessary to analyze the logs for isolating the cause of the fault.

As the data transmission networks increase in size and capacity, the rate at which these observable events occur also increases, making fault management more complex. As an example, a fault in the network may cause many active calls to clear for the same reason, generating a log for each affected call. Also, if a call attempt fails, new failure logs due to the same problem will be generated each time the originator re-attempts to set-up the call. In some cases, almost thousands of identical failure logs, related to the same fault could be generated. Still further, as the fault rate increases with the number of nodes, the traffic generated by fault also increases. In turn, fault propagation may further generate additional events.

To deal with the increase in the number and complexity of failure logs resulting from failed calls, modern management systems enable automatic collection and reporting of failures, thereby reducing the load on human operators or programs. However, current methods of storing failure logs require large storage space and involve huge failure log queues. Large queues are undesirable because they tend to consume large amounts of memory. Also, the queue can overflow when large numbers of failure logs are being created at a high rate, resulting in lost failure information. Unless the failure logs are correlated to the event that produced them, a single problem in a single subsystem could result in multiple, uncoordinated corrective actions. This can lead to wasteful resources spent on duplicate efforts and inconsistent corrective actions, which result in an escalation of problems.

There is a need to provide a method for reducing the number of records that pertain to the same failed connections (calls), while maintaining the integrity of the fault information. By reducing the number of failure records that need to be analyzed, accurate determination of the number and identity of discrete problems that need to be analyzed and rectified becomes easier.

To avoid corrupting the integrity of the fault information, the information in the failure logs needs to be processed sequentially. Therefore, both the managed system and the management system send and respectively process the failure logs in time sequence, and the failure records must provide this timing information.

There is need to maintain the timing information associated with the failure logs resulting from the failed calls, for enabling accurate processing and investigation of the failure records.

SUMMARY OF THE INVENTION

It is an object of the present invention to provide an improved call failure recording that alleviates totally or in part the drawbacks of the prior art failure recording methods.

Another object of the invention is to provide a call failure recording method that reduces substantially the number of failure records stored for enabling efficient processing of the information contained in the logs, while maintaining the integrity (sequence) of fault information.

Accordingly, the invention provides a method for recording call failure information in a data transmission system, comprising: generating a first failure log in response to a failure event, the first failure log including a failure type and a first time stamp and placing the first failure log in a queue; formulating an identifier for the first failure log based on the failure type; and creating a log record for the first failure log and storing the log record in a log record storage.

The invention also provides a device for recording call failure information in a data transmission system, comprising: means for generating a failure log in response to a failure event, the failure log including a time stamp; a log queue for temporarily receiving the failure log; means for formulating an identifier for the failure log based on a failure type of the event that generated the failure log; means for creating a log record for the failure log, which includes the identifier, and a log record storage for storing the log record.

One of the advantages of the invention is that it uses less storage space then in the prior art approaches, making the use of the proposed method more cost-effective. Furthermore, since the fault information consumes less space than in the prior art methods, the fault information can be sorted, retrieved and processed faster.

A further advantage of the invention is that all failure logs generated by the same network fault point to that fault, so that fault isolation is significantly simplified. Configuration is supported to allow users to refine fault log investigation such that each failure generates different failure logs.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENTS OF THE INVENTION

The present invention uses event correlation techniques and some call parameters (such as the cause code, called/calling party, physical location) to group distinct failure logs triggered by the same event, thereby shortening the failure log queues into a form more readily managed by the network operator. By grouping the failure events to their underlying causes, the time between faults and repairs is importantly reduced and also automatic correction of some diagnosed problems becomes feasible. A call will generate as many failure logs as there are points of failure in the network for that particular call. For example, if an attempted call from the source to the destination node fails at three distinct nodes, in the network, this will result in a detailed failure log being generated at each of the three nodes for the same call.

Also, in a typical network it is fairly common for a single trigger (event) to cause a lot of call failure logs of the same type. In such a case, the detailed call failure log will be easily filled up many times over with information that is redundant. For example, a link or port failure will cause all calls that have been set up on the failed link to be released with the same cause and diagnostic, and will trigger one detailed log with a count of affected calls.

Figures 1A, 1B:
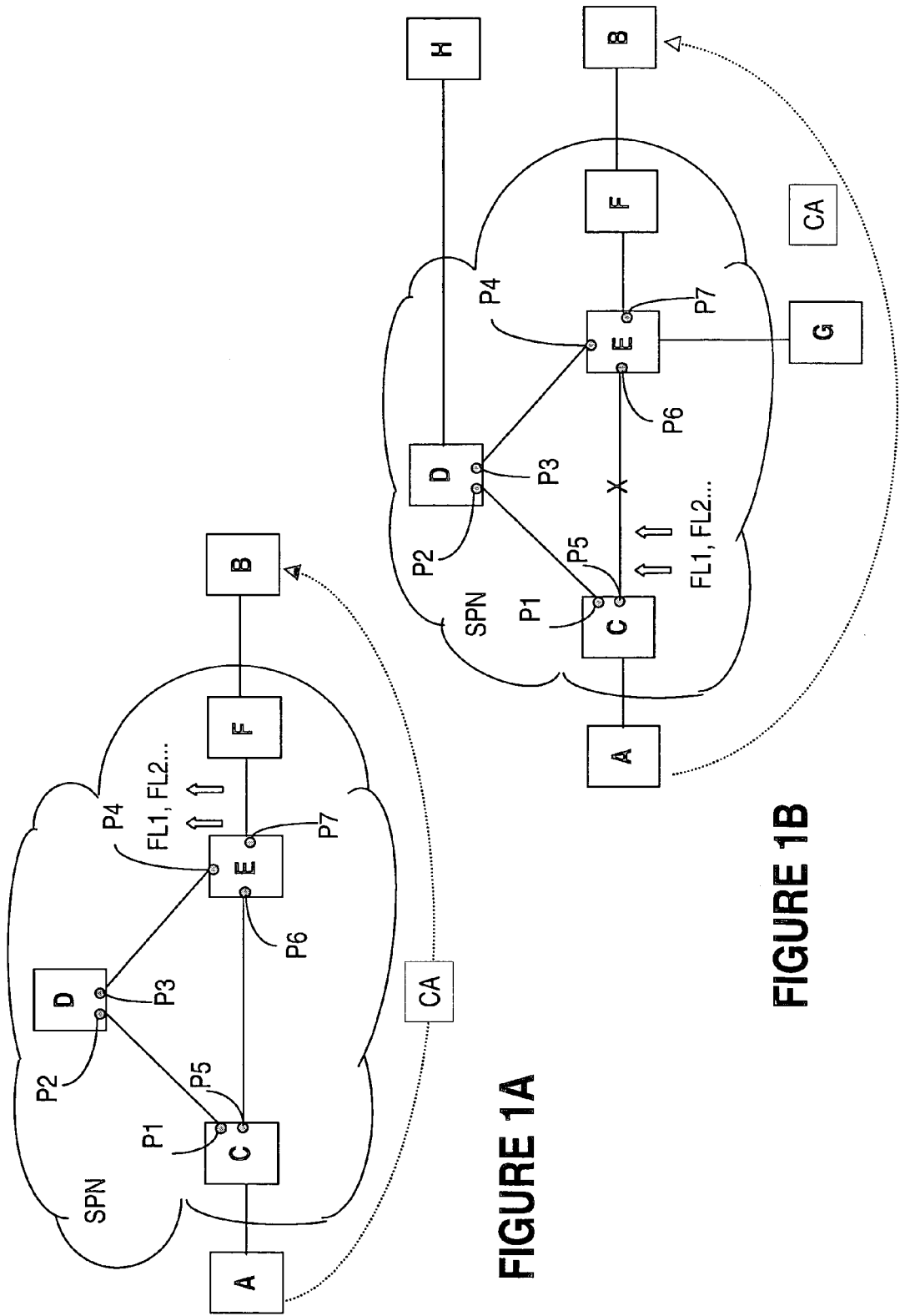
FIGS. 1A, 1B and 1C are block diagrams of a portion of a service provider network for illustrating various fault log generation scenarios for call attempts between users of the network.

FIGS. 1A and 1B provide two examples of failures and how the failure data is processed. The improvement to call failure recording according to the invention is described later, after description of FIG. 2, which provides the main elements of the invention.

FIG. 1A illustrates a service provides network SPN connecting two end user nodes A and B. Provider's network has in this example nodes C, D, E and F connected as shown, where nodes C and F are in direct communication with a respective user node. We assume that node A (source node) attempts a call to end user B, as shown by the arrow denoted with CA (call attempt). Let us also assume that the call attempt fails at port P7 on node E, due to lack of resources. Node E creates a call failure log FL1 and stores it. End user A re-attempts the call to end user B, but the call attempt fails again at port P7, for the same reason. Node E creates a new call failure log FL2. Node E will create a call failure log for each ensuing call attempts for an A-B connection.

In the current implementation, this second failure log and the next ones are stored at node E. In addition, failure logs may be generated at node C, being the originating point for the call from the perspective of the service provider network. It is apparent that a very large number of failure logs may be issued to indicate failures due to the same cause. The present invention is directed to detecting and handling the duplicate failure for reducing the memory space used by the duplicate records and most importantly for optimizing processing of the failure logs.

In the example of FIG. 1A, node E determines that FL2 is a duplicate of FL1 and rather than storing FL2 as a separate record, updates the original log to indicate another failure with the same cause. All failure logs generated at node E due to the end of resources on port P7 will be recognized as duplicates and will update the failure log with the last call attempt information.

FIG. 1B shows an example that uses the same service provider network SPN but shows more end users attached to it. Let us assume that there are a plurality of the calls setup between end nodes A, B, G and H which traverse ports P5 and P6. Let us also assume that the link between these ports is broken, causing all calls on this link to re-route. For each affected call from node C port P5 to node E on port P6, node C, as well as node E, will create a failure log.

According to the invention, node C can be configured such that only the first failure log FL1 is stored at node C. For each subsequent call affected by the broken link, the associated failure log is determined to be a duplicate and rather than storing the log, the original failure log is updated.

It is to be noted that failure logs may be generated at any of the service provider "source nodes" where the failed call originated from the service provider network perspective (e.g. node D for a call H-B). Duplication detection and handling may apply to these logs as well.

Figure 1C:
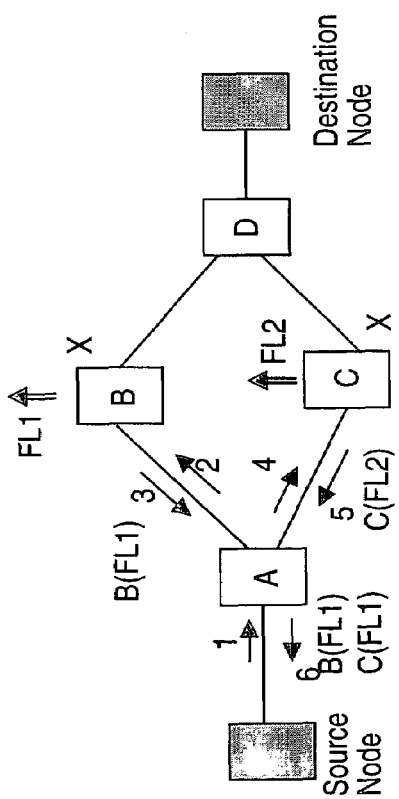

FIG. 1C is a block diagram of a part of a network for illustrating call failure information propagation for two failed attempts for the same call, when the service provider network attempts to avoid the failure using an alternative route. The call sequences are shown by numerals on the arrows that indicate the respective action. To begin, the source node is configured to originate a call to reach the destination node. The source node initiates a path set-up and the call is sent out over the signalling link connecting the source node with node A, as shown at 1. Node A receives the call setup and forwards the call to node B, which has, in this example, the lowest path cost to the destination node, arrow 2. Node B receives the call setup and tries to forward it to node D, but fails for whatever reason. A detailed call failure log is generated. The failure log ID, FL1 and the identity of the failure node are sent with a crankback message to node A, arrow 3.

Node A receives the crankback message, extracts the above information, stores it temporarily in a call event buffer, and sends again the call setup message towards the destination node, now through node C, as shown by arrow 4. Node C receives the call setup and tries to forward it to node D, but fails for a link failure reason. A detailed call failure log is generated and the log ID FL2, together with the node C identity are sent back to node A, as shown by arrow 5.

Node A receives this crankback message, extracts the node ID and the log ID, stores this information in the call event buffer and tries to find a further alternate path towards node D. As no alternative path exists, node A retrieves the temporary stored information related to this call attempt, inserts it into a release message, and sends the release message containing B (FL1) and C (FL2) back to the source node, as shown by arrow 5. In addition, the node identifier may be sent back to the source node also. This will allow a user to look at the call failure and have a picture of the path taken by the failed call.

The source node receives the release message, extracts the failure information and stores the failure log into a source failure log queue for further processing.

A further example is a fault on a soft permanent virtual circuit (SPVC). This is a permanent virtual path that is initially configured through a management interface, but is connected using ATM signalling and routing. A single SPVC may fail e.g. due to a misconfigured destination. All re-tries of the same call will generate identical information for the detailed failure log and again in this case a single log with the failure information would be a better fit.

Figure 2:
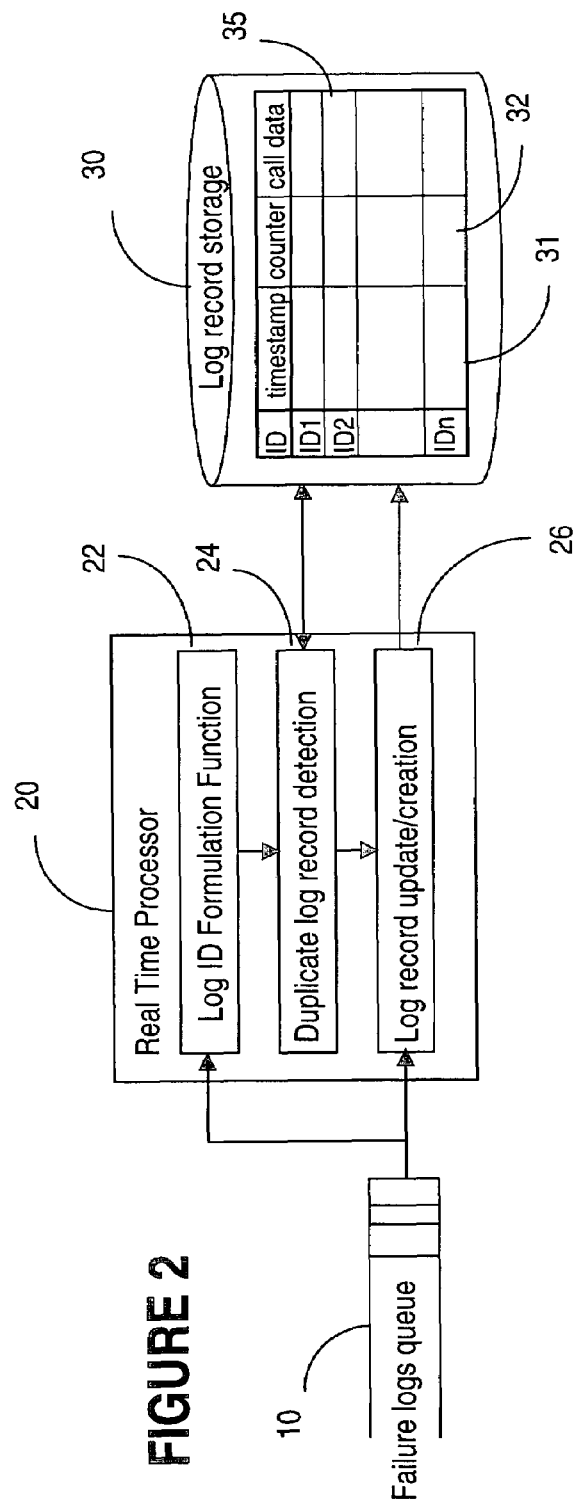
FIG. 2 shows a block diagram of the call failure recording system according to an embodiment of the invention.

FIG. 2 is a high-level block diagram of the call failure recording system according to an embodiment of the invention. The main elements of the system are a queue log 10, a real-time processor 20 and a log record storage 30.

When a new call attempt fails on a node, details of the failure are logged in queue 10; however, the queue 10 is smaller than prior art queues due to the faster log processing achieved. The maximum number of call failure logs that can wait in queue 10 is dependent on the amount of data carried by each log. For example, a failure record may comprise the calling party and called party address, the call request parameters, the ingress and egress ATM endpoints, a standard based release cause, a proprietary release cause, the call type, a time stamp (preferably milliseconds granularity) of the first failure of the respective type, a timestamp with the most recent failure of the respective type, and the number of failures of the same type. Some of the above information may not be available, depending on the stage of processing the call. To display the call failure logs, filtering capability is also provided to output specific failure logs of interest.

The queue is emptied into the real-time log processor 20 sequentially (one log at a time). Processor 20 includes a log ID formulation unit 22, a duplicate log record detector 24 and a log record creation unit 26. Log ID formulation unit 22 provides a unique failure log ID based on the type of failure log. For example, logs in respect of failed active calls may have their failure reason (e.g. failure of a link) and failure point (e.g. a port at the end of the failed link) inspected to determine the failure log ID, or type. Logs pertaining to call attempts may have their failure reason, calling and called party fields inspected for establishing the ID.

The resulting failure log ID is passed to the duplicate log record detection function DRDF 24. DRDF 24 inspects log record storage 30 to determine if a log record having the same failure log ID already exists in the storage. If no, the failure log with its ID is passed to the log record creation unit 26, where a new failure log record is created. A failure log record contains similar information with the original failure log such as call data (source and destination) and failure data (failure reason, failure point) and additionally it includes a counter, which counts the failure logs having the same failure log ID.

If a log record having the same failure log ID already exists in the storage 30, the respective record is updated. The time of the last log is maintained as shown in table 35, column 31. As indicated above, the time of the first failure with the same ID is also stored. For each standard failure cause, a count of failures is updated, as shown in table 35, column 32.

A count may also be maintained to indicate the current number of faults for each proprietary clause. Both these counts are retrievable, and they constitute a convenient first place to look in a node to determine the cause of call failures occurring on the node. These statistics complement the existing call failure statistics available on the node (signalling statistics and routing statistics). It is to be noted that the parameters that determine whether two faults pertain to the same fault are user-configurable.

With reference to the example of FIG. 1A, according to the invention, node E that generated a number of failure logs for the same fault on port P7, places these failure logs in its failure log queue 10. When the first log FL1 is created, the corresponding log record is time stamped and stored in log record storage 30. Then, since FL2 is a duplicate of the FL1, the record corresponding to FL1 is updated by adding the time stamp of FL2 in field 31 and increasing the count in field 32 by 1. An important reduction is storage space is obtained in this way, as well as a faster processing of the queue 50 and an easier interpretation of the records.

Figure 3:
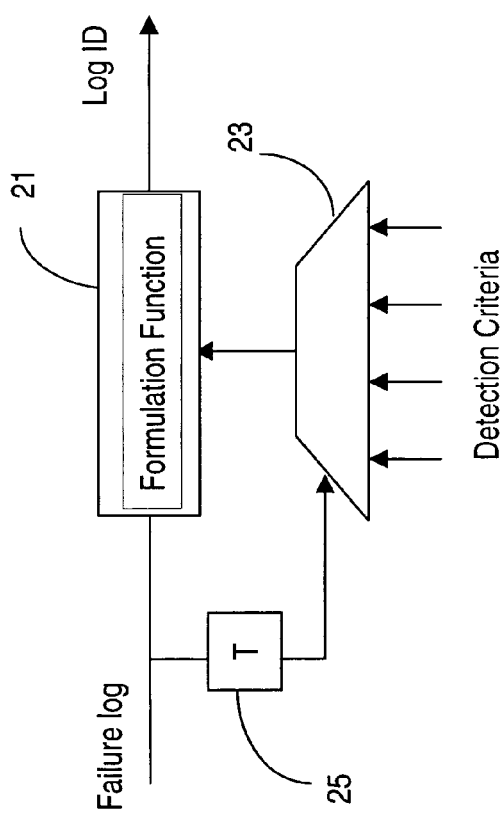
FIG. 3 illustrates log identification formulation according to one embodiment of the invention.
Figure 4:
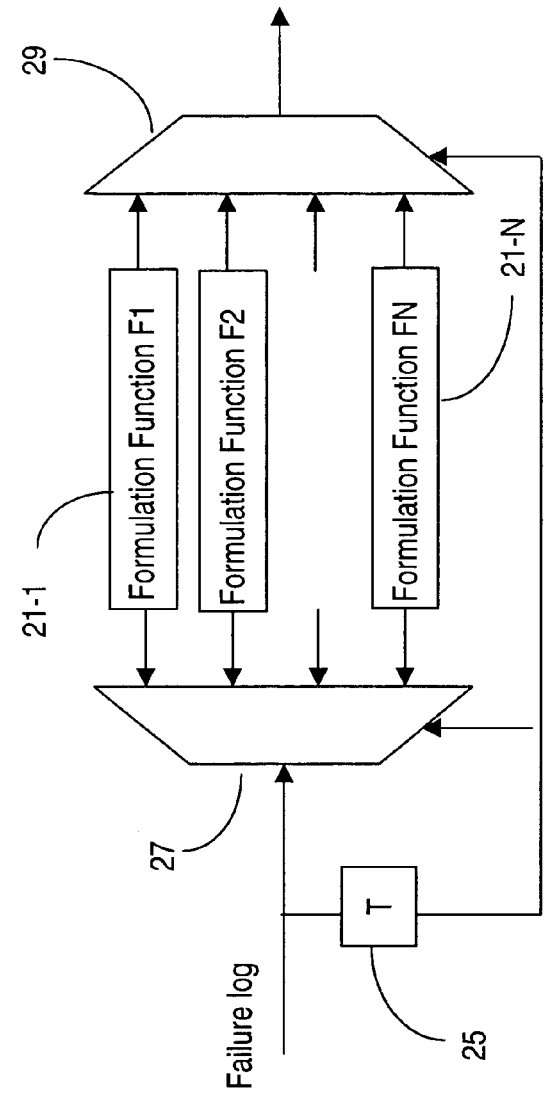
FIG. 4 shows log identification formulation according to another embodiment of the invention.

FIGS. 3 and 4 show a respective block diagram of a variant of the log ID formulation unit 22. FIG. 3 shows an option where function unit 21 performs a preset function on selected portions of the failure log to generate the log ID. For example, unit 21 may perform a checksum or other CRC-type function on the failure log. The portions of the failure log to be selected for this purpose depends on the type of failure, as illustrated by the filter 23. The log type determination is performed in log type block 25. The function block 21 shown in FIG. 3 can be programmed in real time, with different detection criteria. The criteria may be applied to all attributes of the log, or to a subset of attributes, which are selected according to the log type. The criteria may for example be the failure reason and location (point), or other attributes such as the call type (call attempt, or active call), call configuration (from node A to node B) as described above. Standard or proprietary failure causes may be used.

FIG. 4 illustrates an implementation using a plurality of function blocks 21-1 to 21-N, each for a specific type of failure log and each using a different combination of fields in the respective log to generate the log ID. Blocks 27 and 29 intuitively illustrate that the logs are separated (block 27) from the queue 10 according to their type, and re-combined (block 29) at the output of function blocks 21.

A network user may wish to see a single log with failure count for all failures with identical cause and diagnostics (e.g. switch congestion due to connection capacity reached). On the other hand, the network operator may want to capture every failure as an independent log as part of a particular problem investigation. In order to satisfy these difference requirements, the improved call failure recording according to the invention may be provided as a configurable feature. A call failure equivalence may be used to determine the criteria to log a call failure as an independent log, or as another occurrence of the same type of call failure. If the new log is an equivalent, then fields 31 and 32 are updated (the last failed call timestamp and the failure count).

We claim:

1. A method for recording call failure information in a node in a data transmission system, the method comprising:
   generating, in the data transmission system, a first failure log in response to a failure event, said first failure log including a failure type and a first timestamp;
   placing said first failure log in a queue maintained in the node;
   formulating an identifier for said first failure log by inputting at least one field from said failure log into a formulation function, wherein said at least one field is selected based on said failure type; and
   when no existing record in a log record storage in the node includes said formulated identifier, creating a log record for said first failure log and storing said log record in said log record storage, said log record including said formulated identifier.

2. The method of claim 1, wherein said log record comprises:
   a timestamp field for storing said first timestamp, and
   a count field for storing a count indicating the number of log records generated by said failure event.

3. The method of claim 2, further comprising:
   generating, in the data transmission system, a further failure log in response to said failure event, said further failure log including said failure type and a current timestamp;
   formulating an identifier for said further failure log by inputting at least one field from said further failure log into said formulation function, wherein said at least one field from said further failure log is selected based on said failure type; and
   updating said log record in said log record storage to document said current timestamp.

4. The method of claim 3, further comprising incrementing said count by one to indicate the current number of failure logs with said identifier that have updated said log record.

5. The method of claim 1, wherein, for an active call, said at least one field includes a standard failure reason field and a failure point field.

6. The method of claim 1, wherein, for a call attempt, said at least one field includes a standard failure reason field, a calling party identification field, and a called party identification field.

7. The method of claim 1, wherein said at least one field further includes a proprietary failure reason field.

8. The method of claim 1, wherein said step of formulating an identifier comprises applying a Cyclic Redundancy Check (CRC) type checksum function to said at least one field in said failure log.

9. The method of claim 2, further comprising using said count indication to complement the call failure statistics collected over said network.

10. The method of claim 1, wherein said step of formulating an identifier comprises:
   selecting n fields in said failure log; and
   selecting a function that provides a unique result when applied to a data configuration and applying said selected function to the data included in said n fields.

11. The method of claim 10, wherein said selected function is a Cyclic Redundancy Check (CRC) type checksum function.

12. The method of claim 10, further comprising selecting said fields with a configurable filter.

13. The method of claim 1, wherein said step of formulating an identifier comprises:
   selecting n fields in said failure log according to said failure type;
   selecting a plurality of functions, a function for each said failure type, each function providing a unique result when applied to a data configuration; and
   applying, to the data contained in said n fields, a function corresponding to the failure type in said failure log.

14. A device for recording call failure information in a data transmission system, comprising:
   means for generating a failure log in response to a failure event, said failure log including a failure type and a time stamp;
   a log queue for temporarily receiving said failure log;
   means for formulating an identifier for said failure log, wherein said means for formulating an identifier receive an input of at least one field from said failure log and said at least one field is selected based on said failure type;
   means for creating a log record for said failure log when no existing log record includes said identifier, said log record including said identifier; and
   a log record storage for storing said log record.

15. The device of claim 14, further comprising means for updating said log in said log record storage.

16. The device of claim 15, wherein said means for formulating comprises:
   a log type block for providing a failure type indicating the type of event that generated said failure log;
   a filter for selecting said at least one field in said failure log; and
   a formulation function unit for receiving said failure log, applying said formulation function to the data contained in said at least one field, and providing a unique log ID.

17. The device of claim 16, wherein said filter is configurable.

18. The device of claim 14, wherein said means for formulating comprises:
   a log type block for providing a failure type indicating the type of event that generated said failure log;
   a plurality of formulation function units, a unit for each said failure type, each unit for creating a log record with a unique identification;
   a separator for receiving said failure log and directing said failure log to a formulation function unit corresponding to said failure type; and
   a combiner for directing said log record from the output of each said formulation function unit to said log record storage.

* * * * *